(12) United States Patent
Lin et al.

(10) Patent No.: US 8,479,008 B2
(45) Date of Patent: Jul. 2, 2013

(54) PROVIDING SECURITY SERVICES ON THE CLOUD

(75) Inventors: Jian Lin, Sammamish, WA (US); Igor Liokumovich, Sammamish, WA (US); Edward F. Reus, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 12/969,433

(22) Filed: Dec. 15, 2010

(65) Prior Publication Data

US 2012/0159178 A1 Jun. 21, 2012

(51) Int. Cl.
*H04L 9/32* (2006.01)

(52) U.S. Cl.
USPC .......................................................... 713/178

(58) Field of Classification Search
USPC .......................................................... 713/178
See application file for complete search history.

(56) References Cited

U.S. PATENT DOCUMENTS

| 6,868,160 B1 | 3/2005 | Raji |
| 7,113,996 B2 | 9/2006 | Kronenberg |
| 2005/0154879 A1 | 7/2005 | Engberg et al. |
| 2006/0191020 A1 | 8/2006 | Miller |
| 2008/0080718 A1 | 4/2008 | Meijer et al. |
| 2009/0097657 A1 | 4/2009 | Scheidt et al. |
| 2009/0254572 A1* | 10/2009 | Redlich et al. ............. 707/10 |
| 2009/0300719 A1 | 12/2009 | Ferris |
| 2010/0299313 A1* | 11/2010 | Orsini et al. ............. 707/652 |

OTHER PUBLICATIONS

Database Encryption, Part 5: Key Management, Jul. 1, 2009, (3 pages).

* cited by examiner

*Primary Examiner* — William S. Powers
*Assistant Examiner* — Stephen Sanders
(74) *Attorney, Agent, or Firm* — Workman Nydegger

(57) ABSTRACT

Embodiments are directed to the providing a cloud keying and signing service and to securing software package distribution on the cloud. In an embodiment, a computer system instantiates a signing service configured to sign software packages. The computer system receives a signing request from a computer user requesting that a selected software package be signed. The signing request includes a computed hash of the selected software package. The computer system generates a private and public key pair on behalf of the computer user and stores the private key of the generated key pair in a secure data store.

21 Claims, 4 Drawing Sheets

PROVIDING SECURITY SERVICES ON THE CLOUD

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are distributed via an application server. In many businesses and other entities, the application server is an internal, trusted server. In such cases, because the server is trusted, software application packages are often left unsigned and are usually unencrypted. Remote application servers, however, typically cannot go without these protections. As a result, remote application servers increase the amount of work needed for a secure implementation.

BRIEF SUMMARY

Embodiments described herein are directed to the providing a cloud keying and signing service and to securing software package distribution on the cloud. In one embodiment, a computer system instantiates a signing service configured to sign software packages. The computer system receives a signing request from a computer user requesting that a selected software package be signed. The signing request includes a computed hash of the selected software package. The computer system generates a private and public key pair on behalf of the computer user and stores the private key of the generated key pair in a secure data store.

In another embodiment, a computer system instantiates a signing service configured to decrypt software packages. A selected software package includes an encrypted symmetric key. The computer system receives the encrypted symmetric key from a user, the encrypted symmetric key having been encrypted using a public key. The computer system decrypts the symmetric key using a corresponding stored private key and sends a decrypted symmetric key corresponding to the software package to the user for decryption. The user decrypts the software package using the decrypted symmetric key and installs the decrypted package.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
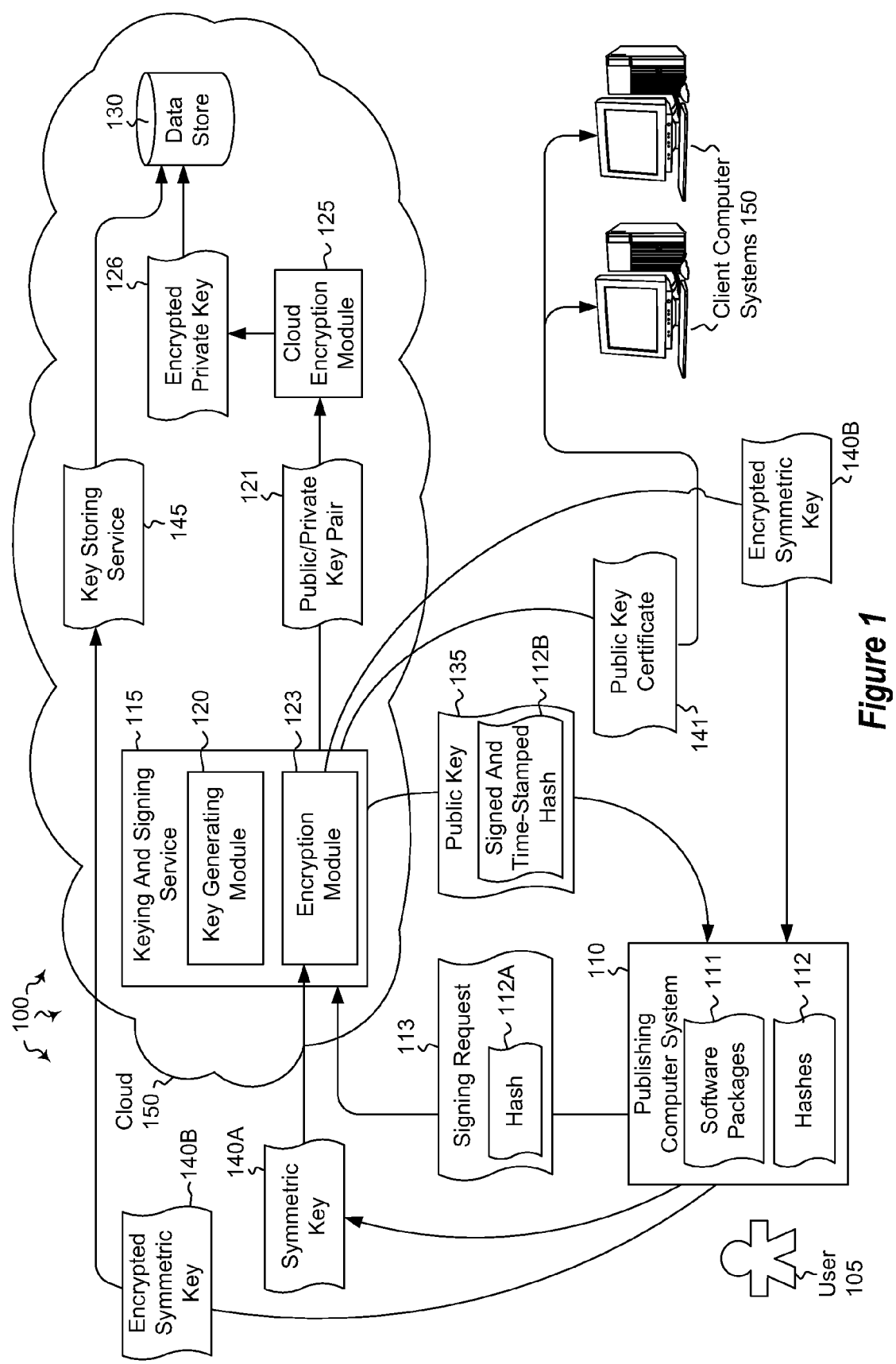
FIG. 1 illustrates a computer architecture in which embodiments of the present invention may operate including providing a cloud keying and signing service and securing software package distribution on the cloud.

Embodiments described herein are directed to the providing a cloud keying and signing service and to securing software package distribution on the cloud. In one embodiment, a computer system instantiates a signing service configured to sign software packages. The computer system receives a signing request from a computer user requesting that a selected software package be signed. The signing request includes a computed hash of the selected software package. The computer system generates a private and public key pair on behalf of the computer user and stores the private key of the generated key pair in a secure data store.

In another embodiment, a computer system instantiates a signing service configured to decrypt software packages. A selected software package includes an encrypted symmetric key. The signing service receives the encrypted symmetric key from a user, the encrypted symmetric key having been encrypted using a public key that was generated based on a hash of the software package. The signing service decrypts the symmetric key using a corresponding stored private key and sends a decrypted symmetric key corresponding to the software package to the user for decryption. The user computer system decrypts the software package using a decrypted symmetric key and installs the decrypted package.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes cloud 150. As used herein, the term cloud refers to a set of distributed computing resources which are accessible over the internet. The computing resources may include computer systems, software applications, databases or other storage systems, or any other hardware or software means configured to provide a service to a user or other system. Keying and signing service 115 is hosted on the cloud. As such, any authorized user may access the service over the internet.

In some embodiments, the keying and signing service 115 may be used in the process of signing software application packages. Software applications may be signed so as to be trusted by the installing party. If the software application is signed by a trusted party, the user can trust that the software package is authentic and has not been changed. Thus, the keying and signing service may interact with other computing modules to sign a software package.

In some cases, an administrator or other computer user may desire to have a software package signed before rolling the package out to end-users. As such, user 105 may send a signing request 113 from computer system 110. Instead of sending the entire package to the keying and signing service for signing, the computer system may send a hash 112A of the software package 111 that is to be signed. The hash may be computed using any of a variety of hashing algorithms. The computed hash values for different software packages 111 may be stored in the computer system (e.g. hashes 112). The keying and signing service may receive the signing request along with the accompanying hash value and generate a public/private key pair 121.

The signed hash may additionally be time stamped to identify when the hash was signed. The key pair 121 may be sent to cloud encryption module 125 which encrypts the private key 126 and stores the key pair (including the encrypted private key) in data store 130. The public key 135 and signed hash 112B, along with an optional time stamp may be returned to the computer system. The computer system generates a symmetric key 140A which is used to encrypt/decrypt a software package (e.g. 111). The computer system uses the keying and signing service 115 to encrypt the symmetric key and send the encrypted symmetric key to key storing service 145 which stores the symmetric key in a secure manner. These concepts will be explained in greater detail below with regard to methods 200 and 300 of FIGS. 2 and 3, respectively.

In some cases, the key and signing cloud service 115 may generate the key pair on behalf of the customer the first time when the customer requests a given service. The generated key pair may be saved into a secure data store (e.g. data store 130). The private key portion may be further encrypted before being saved to secure data store, and, at least in some cases, the stored private key does not leave the core service boundary. This provides increased system integrity and performs private key management for the customer. The public key certificate 141 may be distributed to targeted computers (e.g. client computer systems 150) via policy or via on-demand retrieval.

In one embodiment, a cloud-based keying and signing service may be implemented in a software distribution. A client desiring to publish a software application may generate a hash of the to-be-signed software package, and send the hash to the signing service to be signed and time stamped. The returned signed and time stamped signature may then be applied to the original software package to form a signed and time stamped software package.

With the certificate key pair 121 managed on the cloud 150, the keying and signing service 115 can provide encryption and decryption services. For instance, in software distribution, the publishing client may leverage encryption module 123 to encrypt (or decrypt) a symmetric (e.g. advanced encryption standard (AES)) key 140A, which is used to encrypt/decrypt software package, with the public key. A software distribution agent may be implemented which calls encryption module 123 to decrypt the AES key with the private key.

The public key certificate 141 may be distributed to targeted computers (e.g. 150) or revoked from the targeted computers via policy or via on-demand retrieval. For example, a software distribution agent may call a certificate synchronization service to install the certificate into a trusted root store. When a compromised certificate is to be revoked or removed, a policy that contains the certificate thumbprints may be generated and distributed to all the targeted computers via policy workload. A software distribution agent may locate the certificates that match the thumbprints and remove them.

In one embodiment, an IT administrator's (or other user's) computer system (e.g. 110) may be used to publish a software application (e.g. software package 111) to one or more different client computer systems. Keying and signing service 115 may be instantiated in the cloud to provide keying and signing functionality. Cloud data store 130 may be used to store an encrypted private key 126. Network connections between computer system 110, cloud 150 and the various client computer systems may be mutual authenticated and encrypted. This authentication and encryption may be done with secure sockets layer (SSL) and/or client and server certificates.

Continuing the above embodiment, the user of computer system 110 may have an account with the keying and signing service. Keying and signing service 115 may be a multi-tenant service, with each tenant (or customer) having a separate account. Either when the user's account is first provisioned, or the first time the user uses the keying and signing service to publish an application, a key/pair (public key/private key) 121 is created and provisioned into the keying and signing service. The public key certificate 141 may then be provisioned onto various client systems 150. The public key may be wrapped in a software publishing certificate (SPC) or other type of digital certificate.

When the administrator (or other user) wishes to publish a software application, a hash (e.g. secure hash algorithm (SHA-2) or cryptographically stronger hash) 112A may be calculated for the application package 111 and sent to the signing service. The hash is then signed by the keying and signing service and returned to computer system 110, which then attaches the signed hash to the (now signed) package. The administrator's computer system then generates symmetric key 140A (e.g. AES) and encrypts the software package that is being published. Each published package has a separate symmetric encryption key. Thus, one key cannot be used against multiple different packages—it is only usable with the package it was created for (i.e. the package whose hash was send to the keying and signing service). The administrator's computer system then sends the symmetric encryption key to the keying and signing service where encryption module 123 encrypts it with the public key from the public/private key pair 121.

The administrator's computer system 110 then sends the encrypted symmetric key to key storing service 145 which sends the key to cloud data store 130 to hold for subsequent retrieval by the client systems. The encrypted symmetric key 140B is associated with the software package 110 by its package ID in the key storing service. The software package may also be uploaded to the shared data store 130, where it is reachable by clients that wish to install the package. The administrator may target the package to some set of client systems where with the software package is stored in the cloud data store. These targeted clients are the only clients that are allowed to access the stored software package.

The client may connect to the data store, whereupon the client is notified that a software package is available for it. The client receives the encrypted symmetric key 140B and a uniform resource locator (URL) for the package. As indicated above, only clients specified by the administrator (i.e. targeted clients) receive the key and URL. The client may implement the SPC to validate the software package. The SPC may have been previously provisioned to the client (into its key store), or may be provisioned dynamically from the keying and signing service. The SPC may need to be revoked if the symmetric key is compromised or expires.

The client connects to the keying and signing service and passes the encrypted symmetric key to have the key decrypted. Because the client is a known member of the customer's account, the key is decrypted (using the private key of the public/private key pair 121) and sent back to the client. The client thus has the symmetric key to decrypt the software package and the SPC (which was used to wrap public key 135) to check the package signature to make sure that the publisher is trusted and the package has not been modified. The client computer system can now install the software package. It should be noted that the above embodiment is only one example, and that many variations of that embodiment, as well as other embodiments may be used.

Figure 2:
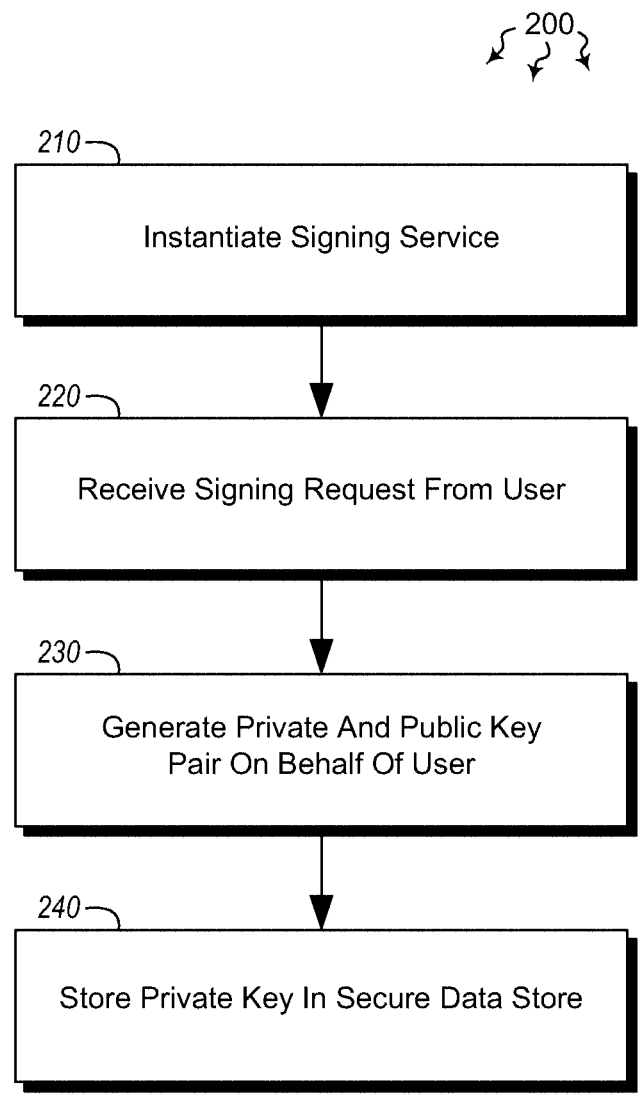
FIG. 2 illustrates a flowchart of an example method for providing a cloud keying and signing service.
Figure 3:
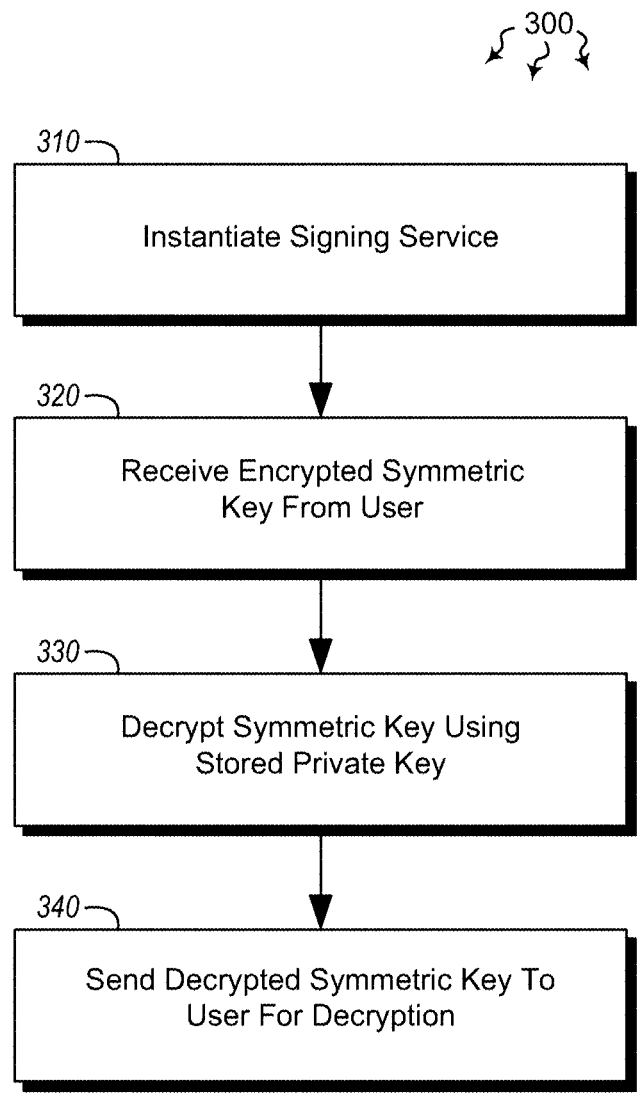
FIG. 3 illustrates a flowchart of an example method for securing software package distribution on the cloud.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 4:
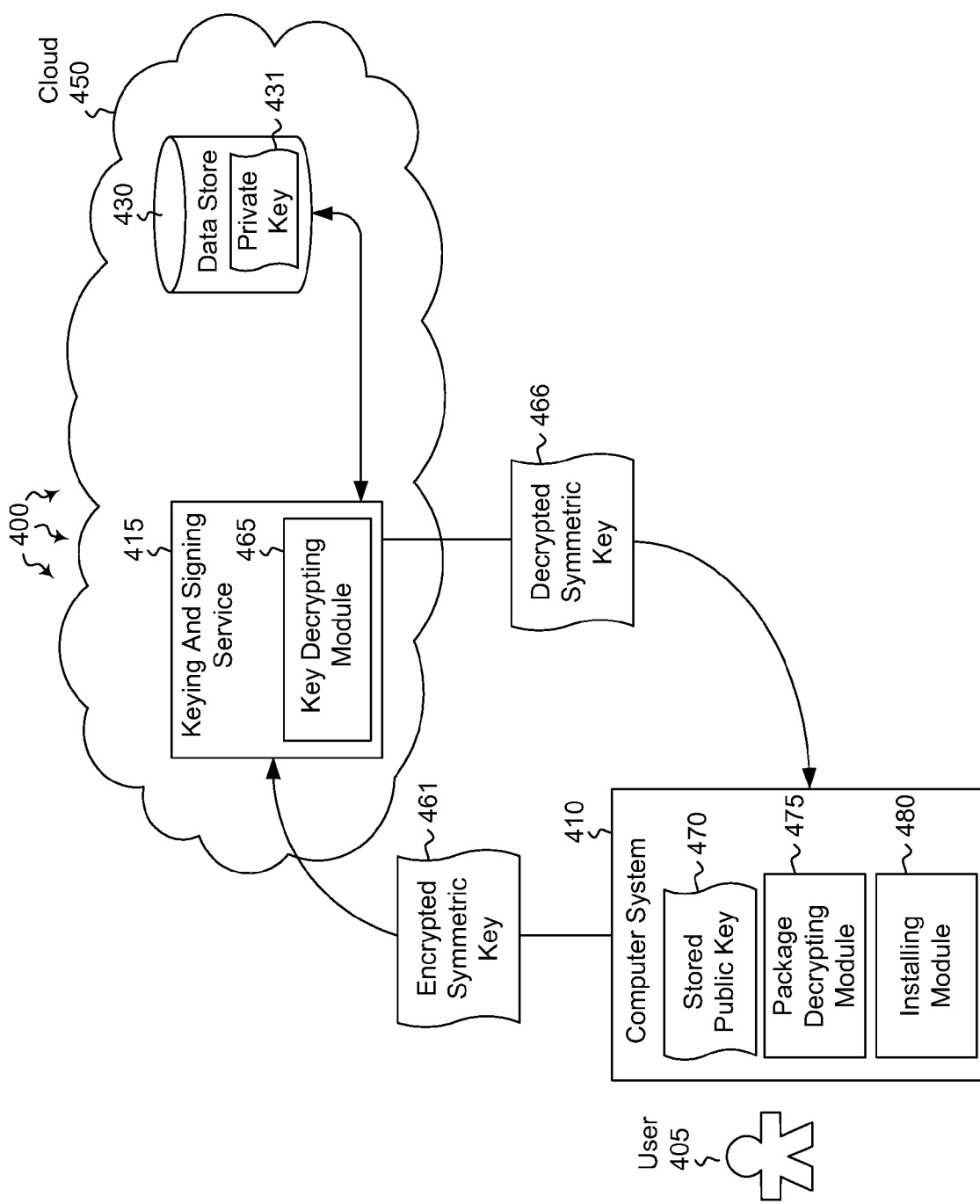
FIG. 4 illustrates a computer architecture in which embodiments of the present invention may operate including providing a cloud keying and signing service and securing software package distribution on the cloud.

FIG. 2 illustrates a flowchart of a method 200 for providing a cloud keying and signing service. The method 200 will now be described with frequent reference to the components and data of environments 100 and 400 of FIGS. 1 and 4, respectively.

Method 200 includes an act of instantiating a signing service configured to sign software packages (act 210). For example, keying and signing service 115 may be instantiated to sign various different software packages 111. The software packages may include software applications, functions, programs or program suites which are to be distributed to various different users. In some cases, the software packages are to be distributed by an administrative user (e.g. user 105) to multiple different users of an organization. The administrator may desire to have the service signed so that the organization's users will know that the integrity of the software package is ensured. Thus, the keying and signing service may be instantiated and implemented to sign software packages. In some cases, the keying and signing service may be an isolated, secure service provided on the cloud 150. As such, the service 115 may be available to a plurality of different users and/or organizations.

Method 200 includes an act of the signing service receiving at the signing service a signing request from a first computer user requesting that a selected software package be signed, wherein the signing request includes a computed hash of the selected software package (act 220). For example, keying and signing service 115 may receive signing request 113 from user 105 requesting that a selected software package be signed. Rather than sending the actual package that is to be signed, a hash value 112A computed based on the package is sent to the service. The smaller-sized hash value may be sent using a relatively small amount of bandwidth, compared to sending the entire software package. The hash value for the software package may be computed by computer system 110. The computer system may also be configured to store the computed hashes 112.

Method 200 includes an act of the signing service generating a private and public key pair on behalf of the first computer user (act 230). For example, key generating module 120 of keying and signing service 115 may generate public/private key pair 121 on behalf of user 105. The key pair 121 may be any type of digital key, generated using any of a variety of key generating algorithms. These key generating algorithms may be public or proprietary (or, at least in some cases, a combination of both).

Method 200 includes an act of the signing service storing the private key of the generated key pair in a secure data store (act 240). For example, keying and signing service 115 may store the public and/or private keys of the key pair 121 in secure data store 130. In some cases, the private key may be further encrypted before being stored in the secure store. For instance, cloud encryption module 125 may further encrypt private key 126 and then store it in the secure data store.

In some embodiments, the keying and signing service may send the generated public key 135 and signed and timestamped hash 112B with a corresponding timestamp signature to user 105. User 105 may apply the received public key and timestamp signature to the selected software package (which was earlier represented by hash value 112A). Computer system 110 may generate a symmetric key 140A which is used to encrypt/decrypt a software package (e.g. 111). The computer system uses the received public key 135 to encrypt the symmetric key and send the encrypted symmetric key to key storing service 145 which stores the symmetric key in a secure manner. In this manner, cloud services can manage key generation, storage and maintenance.

In some cases, the public key may be revocable according to various signing service policies. The policies may indicate that the public key is automatically revoked after a certain period of time, or after a certain specified event has occurred. In some embodiments, certificate management policies may be implemented to synchronize certificates between users and the signing service 115.

The symmetric keys 140A/140B used to encrypt the software package 111 may be generated by an end-user's computer system. A separate symmetric key is generated for each software package. The generated symmetric key may be used to encrypt a software package. The generated symmetric key itself may be encrypted by the public key of the key pair, and it may be saved as part of the metadata of the software package.

FIG. 3 illustrates a flowchart of a method 300 for securing software package distribution on the cloud. The method 300 will now be described with frequent reference to the components and data of environments 100 and 400 of FIGS. 1 and 4, respectively.

Method 300 includes an act of instantiating a signing service configured to decrypt an encrypted symmetric key (act 310). For example, keying and signing service 415 may be instantiated on cloud 450 to decrypt encrypted symmetric key 461. The symmetric key may be encrypted by a public key and, at least in some cases, may be part of a portion of metadata of the software package that is to be distributed. The private key (e.g. 431) may be stored in cloud data store 430.

Method 300 includes an act of the signing service receiving the encrypted symmetric key from a user, wherein the encrypted symmetric key was encrypted using a public key (act 320). For example, keying and signing service 415 may receive encrypted symmetric key 461 from user 405. The encrypted symmetric key may have been encrypted using a public key (e.g. stored public key 470).

Method 300 includes an act of the signing service decrypting the symmetric key using a corresponding stored private key (act 330). For example, key decrypting module 465 of keying and signing service 415 may decrypt encrypted symmetric key 461 using a corresponding stored private key (e.g. private key 431 which is stored in secure data store 430). The private key, along with the public key above, may have been generated by key generating module 120 of the keying and signing service. In this manner, the keying and signing service on the cloud may manage all aspects of key generation, distribution, storage and maintenance.

Method 300 also includes an act of the signing service sending a decrypted symmetric key corresponding to the software package to the user for decryption (act 340). For example, keying and signing service 415 may send decrypted symmetric key 466 corresponding to the software package to user 105's computer system 410 for decryption. Package decrypting module 475 of computer system 410 may decrypt the package using the received decrypted symmetric key. After the package is decrypted, user 405 may validate the software package is signed with the private key 431 using the stored public key 470. Then, the user may install the package using installing module 480. The user may install the package knowing that the package is secure, is from the expected source and has not been tampered with. Moreover, the security of the package may be ensured by providing secure communication between each user and the cloud. For example, each communication between the signing service and the user may be conducted over encrypted channels with mutual authentication.

Accordingly, methods, systems and computer program products are provided which instantiate a cloud keying and signing service that is configured to sign software packages and to maintain and distribute keys. Moreover, methods, systems and computer program products are provided which allow software packages to be securely distribution on the cloud.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for providing a cloud keying and signing service, the method comprising:

an act of instantiating a signing service configured to sign software packages;

an act of receiving at the signing service a signing request from a publisher requesting that a selected software package be signed, wherein the signing request includes a computed hash of the selected software package;

an act of the signing service generating a private and public key pair on behalf of the publisher;

the signing service digitally signing the hash with the public key;

the signing service returning the digitally signed hash to the publisher, wherein the digitally signed hash is subsequently attached to the selected software package;

the signing service receiving, subsequent to returning the digitally signed hash to the publisher, a symmetric key from the publisher, wherein the symmetric key is used by the publisher to encrypt the selected software package;

wherein the symmetric key is encrypted with the public key; and an act of the signing service storing the private key of the generated key pair in a secure data store.

2. The method of claim 1, wherein the computed hash of the selected software package is computed on the publisher's computer system.

3. The method of claim 1, wherein the private key is further encrypted before being stored in the secure store.

4. The method of claim 1, wherein the signing service is an isolated, secure service provided on the cloud.

5. The method of claim 1, further comprising an act of the signing service sending the generated public key and signed hash with a counter-signed timestamp signature to the publisher.

6. The method of claim 5, wherein the publisher applies the received public key, signed hash and timestamp signature to the selected software package.

7. The method of claim 6, further comprising an act of the signing service decrypting the encrypted symmetric key.

8. The method of claim 7, further comprising an act of the signing service sending to both the publisher and one or more end-users a public key certificate corresponding to the selected package.

9. The method of claim 8, wherein the publisher publishes the selected software package encrypted with the symmetric key and signed with the private key.

10. The method of claim 1, wherein the public key is wrapped in a software publishing certificate.

11. The method of claim 9, wherein the public key is revocable according to policy.

12. The method of claim 9, wherein each end-user's computer system has a stored public key that allows each end-user's computer system to verify that the published software package is from the identified publisher.

13. The method of claim 9, wherein the symmetric key used to encrypt the software package is generated by the publisher's computer system.

14. The method of claim 9, wherein separate symmetric keys are generated for each software package and such that the symmetric key is unique to the selected software package.

15. The method recited in claim 1, wherein the method further includes:

an act of the signing service decrypting the symmetric key using a corresponding stored private key; and an act of the signing service sending a decrypted symmetric key corresponding to the software package to an end-user's computer for decryption.

16. A computer system comprising the following:
one or more processors;
system memory;
one or more computer-readable storage media having stored thereon computer-executable instructions that, when executed by the one or more processors, causes the computing system to perform a method for providing a cloud keying and signing service, the method comprising the following:

an act of instantiating a signing service configured to sign software packages;

an act of receiving at the signing service a signing request from a first publisher requesting that a selected software package be signed, wherein the signing request includes a computed hash of the selected software package;

an act of the signing service generating a private and public key pair on behalf of the publisher;

the signing service digitally signing the hash with the public key;

the signing service returning the digitally signed hash to the publisher, wherein the digitally signed hash is subsequently attached to the selected software package;

the signing service receiving, subsequent to returning the digitally signed hash to the publisher, a symmetric key from the publisher, wherein the symmetric key is used by the publisher to encrypt the selected software package;

wherein the symmetric key is encrypted with the public key; and an act of the signing service storing the private key of the generated key pair in a secure data store.

17. The system of claim 16, wherein the system further includes:

an act of the signing service sending the generated public key and signed hash with a corresponding timestamp signature to the first user;

wherein the publisher applies the received public key, signed hash and timestamp signature to the selected software package and publishes the selected software package to one or more end-users; and an act of the signing service sending the public key certificate to the one or more of end-users.

18. A computer program product for implementing a method for securing software package distribution on the cloud, the computer program product comprising one or more computer-readable storage device distinguished from a transmission media, the computer-readable storage device comprising a recordable-type storage device having stored thereon computer-executable instructions that, when executed by one or more processors of the computing system, cause the computing system to perform the method, the method comprising:

an act of instantiating a signing service configured to sign software packages;

an act of receiving at the signing service a signing request from a publisher requesting that a selected software package be signed, wherein the signing request includes a computed hash of the selected software package;

an act of the signing service generating a private and public key pair on behalf of the publisher;

the signing service digitally signing the hash with the public key;

the signing service returning the digitally signed hash to the publisher, wherein the digitally signed hash is subsequently attached to the selected software package;

the signing service receiving, subsequent to returning the digitally signed hash to the publisher, a symmetric key from the publisher, wherein the symmetric key is used by the publisher to encrypt the selected software package;

wherein the symmetric key is encrypted with the public key; and an act of the signing service storing the private key of the generated key pair in a secure data store.

19. The computer program product of claim 18, wherein the act of the signing service generating the private and public key pair on behalf of the publisher is performed for the first time only after the signing service receives the signing request.

20. The computer program product of claim 18, wherein each communication between the signing service and each of the publisher is conducted over encrypted channels with mutual authentication.

21. The computer program product of claim 18, wherein certificate management policies are implemented to synchronize certificates between the signing service and the end-users.

* * * * *